June 27, 1972      G. H. YOWELL      3,672,793

POWER TRANSMISSION

Filed Oct. 28, 1970      2 Sheets-Sheet 1

INVENTOR.
GORDON H. YOWELL
BY
ATTORNEYS

June 27, 1972   G. H. YOWELL   3,672,793
POWER TRANSMISSION

Filed Oct. 28, 1970   2 Sheets-Sheet 2

INVENTOR.
GORDON H. YOWELL
BY
ATTORNEYS

United States Patent Office 3,672,793
Patented June 27, 1972

3,672,793
POWER TRANSMISSION
Gordon H. Yowell, North Branch, Mich., assignor to Sperry Rand Corporation, Troy, Mich.
Filed Oct. 28, 1970, Ser. No. 84,697
Int. Cl. F04b 17/00; 35/00, 39/02, 24/14, 1/00, 27/00
U.S. Cl. 417—368    7 Claims

ABSTRACT OF THE DISCLOSURE

An electric motor-pump unit for hydraulic power systems has a pressure regulated variable displacement, high pressure pump at one end of an electric motor and a low pressure centrifugal charging pump at the opposite end. A path is provided from the low pressure pump through the electric motor to the inlet of the high pressure pump. To maintain a flow of charging fluid to cool the electric motor during periods when no high pressure fluid is required, the pressure responsive regulator for the high pressure pump opens a bypass from its delivery line into the casing to join the scavenged fluid.

---

High performance electric motor-pumps, particularly as used in aircraft, involve the problem of dissipating heat from the electric motor at a substantial rate and it has been customary to use the flow of fluid coming into the high pressure pump as a cooling medium for this purpose. A problem arises, however, when the devices utilizing the high pressure fluid are idle and thus, no flow is required into the high pressure pump. Since these periods may be of considerable duration, the problem has hitherto been avoided only by either the provision of a secondary cooling system or by choosing an electric motor of larger than necessary capacity, both of which expedients add to the size and weight of the overall installation.

The object of the present invention is to provide an improved motor-pump unit which overcomes these disadvantages and provides a smaller, lighter weight unit which is efficiently cooled, both under full load and no load conditions.

This object is achieved by the invention which consists in a combined electric motor and hydraulic pump unit which includes both a variable displacement high pressure pump and a low pressure charging pump and has the improvement which comprises means forming a path through the electric motor for charging fluid going from the low pressure pump to the high pressure pump, together with means responsive to a change in displacement of the high pressure pump to near zero displacement for dumping a small flow of fluid from the high pressure pump to maintain a cooling flow through the electric motor.

Figure 1:
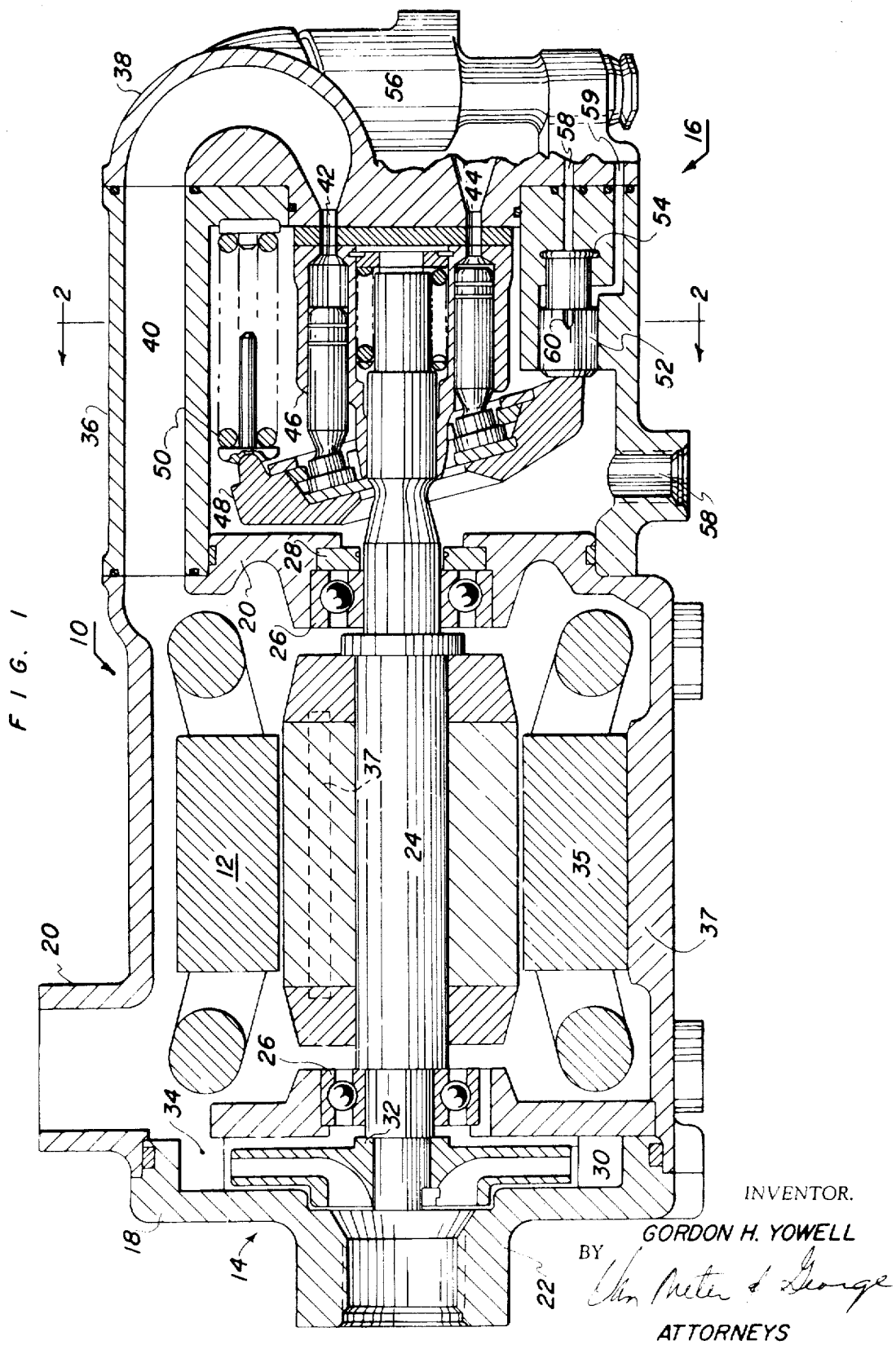
FIG. 1 is a diagrammatic cross sectional view of a motor-pump unit incorporating a preferred form of the present invention.
Figure 2:
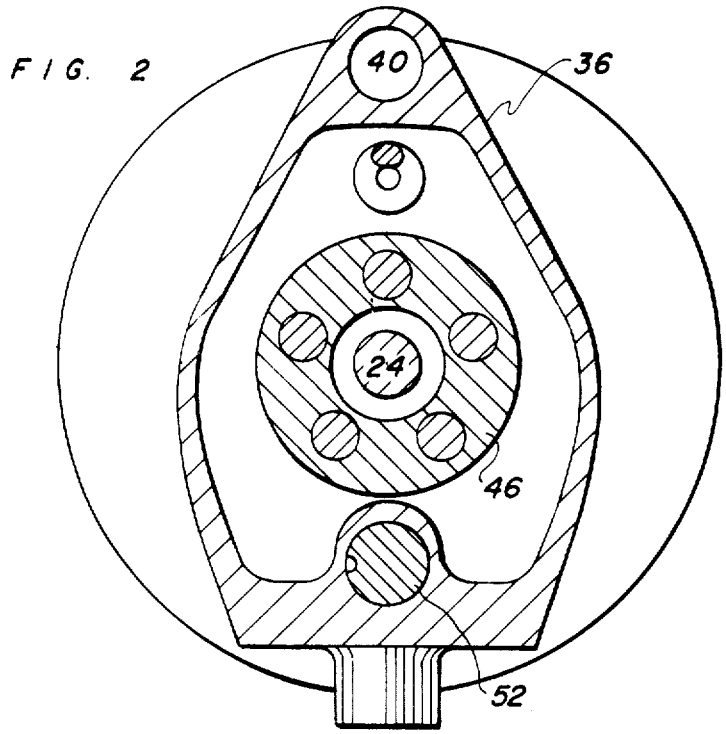
FIG. 2 is a sectional view taken on line 2—2 of FIG. 1.

The invention as embodied in the motor-pump unit of FIGS. 1 and 2 includes a housing 10 which encloses an electric motor 12, a centrifugal charging pump 14 and a high pressure variable displacement axial piston pump 16. The housing 10 has a pair of bulkheads 18 and 20 and an electrical terminal feed-through 20 to receive the usual fluid tight closure through which electrical conductors, not shown, are passed. The bulkhead 18 includes a central main fluid inlet 22 leading directly to the central portion of the centrifugal pump 14.

The unit has a single shaft 24 journalled on bearings 26 in the bulkheads 18 and 20. A labyrinth seal 28 may be provided adjacent the shaft in the bulkhead 20. The bulkhead 18 also provides an outlet scroll 30 for the centrifugal pump 14 to receive fluid from the rotor 32 and direct it to the interior of housing 10 through a discharge opening 34. The bulkhead 18 may actually be formed of two pieces, as indicated. The stator 35 of motor 12 may be pressed into housing 10 which is provided with three or more pads 37 to space the stator from the outer walls of the housing.

The housing 10 also includes two sections 36 and 38 which form the stator of the high pressure pump 16. The section 36 includes a through passage 40 which continues into the section 38 and leads to the arcuate inlet 42 of the high pressure pump. The outlet 44 of the latter leads to a terminal connection, not illustrated, to which the delivery line for the work circuit will be connected. The high pressure pump 16 may be of any well-known variable displacement type and, as here shown, includes an axial piston and cylinder revolving group 46. The pistons are actuated by a tiltable swash plate 48, which is biased into the position illustrated by a spring 50 and may be moved toward a vertical or zero displacement position by means of an actuator piston and cylinder 52–54. The piston 52 is under the control of a pilot valve assembly of usual construction which may be contained in the housing part 56 and communicates with cylinder 54 through a modulated pressure connection 58 and a delivery pressure connection 69.

The interior of the high pressure pump casing which is formed by bulkhead 20, housing section 36, and housing section 38, has a drain connection 58 through which scavenged fluid escaping from the cylinder bores and valve plate of pump 16 may be returned directly to the reservoir. The cylinder 52 has a valving notch 60 which opens to the interior of the case as the piston 52 moves to the left and approaches the point where pump displacement becomes zero. The notch 60 may alternatively be formed in the wall of the cylinder bore at its lefthand end.

In operation, with the unit being driven by the electric motor 12, the centrifugal charging pump 14 withdraws fluid from the inlet 22 and delivers it through opening 34 into the interior of the housing 10. It passes over the stator and rotor of the motor 12 and enters the passage 40 to maintain the inlet 42 of the variable displacement high pressure pump 16 at an elevated pressure. Depending upon the demand of the work circuit for high pressure fluid delivered through outlet 44, the actuator 52–54 will adjust the angle of the swash plate 48 to produce the required delivery volume. Since the pump 14 is of the centrifugal type, its delivery rate will be determined by the rate at which the high pressure pump delivers fluid. When the load requirements in the work circuit diminish to zero, the actuator 52–54 will move the swash plate 48 toward zero stroke position, but before quite reaching that point, the valving groove 60 will begin to open and permit high pressure fluid to flow from the outlet 44 and connection 59 directly into the interior of the housing section 36 and from thence through the scavenged fluid outlet 58 back to the reservoir. Under these conditions, a positive flow of cooling fluid is assured and takes place regardless of the degree of restriction which may be present in the lines extending from outlet 58 back to the reservoir.

I claim:

1. In a combined electric motor and hydraulic pump unit which includes both a variable displacement, high pressure pump and a low pressure charging pump, that improvement which comprises means forming a path through the electric motor for charging fluid going from the low pressure pump to the high pressure pump and means responsive to a change in displacement of the high pressure pump to near zero displacement for dumping a small flow of fluid from the high pressure pump to maintain a cooling flow through the electric motor.

2. A unit as defined in claim 1 wherein the charging pump is a centrifugal pump.

3. A unit as defined in claim 1 wherein the high pressure pump has a pressure responsive displacement changing actuator and the last named means includes a part of the actuator.

4. A unit as defined in claim 1 wherein the rotors of the high and low pressure pumps are mounted on opposite ends of the electric motor shaft.

5. A unit as defined in claim 1 wherein a bulkhead is provided between the electric motor and the high pressure pump and has a labyrinth type seal surrounding the shaft.

6. An electric motor driven hydraulic pump unit comprising a housing, a single shaft journalled in the housing, a variable displacement hydraulic pump rotor connected to the shaft at one end, a centrifugal charging pump rotor connected to the shaft at the other end, and an electric motor rotor connected to the shaft intermediate the pump rotor, an inlet in the housing adjacent the charging pump rotor, a motor stator mounted in the housing, a variable displacement pump stator in the housing and having an inlet for charging fluid and an outlet for high pressure fluid to be delivered to a work circuit, as well as an outlet for scavenged fluid, means forming a path for charging fluid from the rotor of the centrifugal pump past the rotor and stator of the electric motor to the variable displacement pump inlet, a displacement varying actuator having a connection with the high pressure fluid outlet and means in the actuator for bypassing a small flow of high pressure fluid to the scavenged fluid outlet when the actuator approaches a position of zero displacement whereby a positive flow of cooling fluid is maintained during periods of near zero flow into the work circuit.

7. A unit as defined in claim 6 wherein the actuator comprises a piston and cylinder supplied with high pressure fluid and the piston and cylinder also provide a valve means to permit high pressure fluid to escape as the actuator approaches a position of zero displacement.

References Cited

UNITED STATES PATENTS

| | | | |
|---|---|---|---|
| 2,106,488 | 1/1938 | McCune | 417—203 |
| 3,085,514 | 4/1963 | Budzich | 417—269 |

ROBERT M. WALKER, Primary Examiner

U.S. Cl. X.R.

417—203, 271, 415, 350